United States Patent [19]

Foote et al.

[11] Patent Number: 4,650,029
[45] Date of Patent: Mar. 17, 1987

[54] OFF-THE-ROAD FOUR-WHEEL DRIVE VEHICLE

[75] Inventors: Douglas C. Foote, Coon Rapids; James E. Grinde, Anoka, both of Minn.

[73] Assignee: Yamaha Hatsudoki Kabushiki Kaisha, Iwata, Japan

[21] Appl. No.: 810,759

[22] Filed: Dec. 19, 1985

[51] Int. Cl.$^4$ ............................................. F16D 41/02
[52] U.S. Cl. .................................. 180/248; 180/197; 180/233
[58] Field of Search ................ 180/233, 245, 248, 197

[56] References Cited

U.S. PATENT DOCUMENTS

4,103,753  8/1978  Holdeman ......................... 180/233
4,493,387  1/1985  Lake et al. ......................... 180/248
4,535,869  8/1985  Tsutsumikoshi et al. ........... 280/282

Primary Examiner—John J. Love
Assistant Examiner—Donn McGiehan
Attorney, Agent, or Firm—Orrin M. Haugen; Thomas J. Nikolai

[57] ABSTRACT

A four-wheel drive recreational vehicle having an independent front suspension system and a clutch arrangement for normally driving the vehicle from the front wheels only, but capable of sensing slippage of the rear wheels to thereby couple the engine's output shaft to the front wheels as well. The front wheels are equipped with tires which are more narrow than those used on the rear wheels, but the tread width of the front wheels is made larger than that of the rear wheels to thereby provide adequate space for the driving connections between the front differential and the wheels so that only modest bending forces are experienced by the U-joint coupling the driven shaft between the front differential and the wheels' driven axles.

6 Claims, 11 Drawing Figures

OFF-THE-ROAD FOUR-WHEEL DRIVE VEHICLE

BACKGROUND OF THE INVENTION

I. Field of the Invention

This invention relates generally to an off-road, four-wheeled recreational vehicle, and more specifically to a vehicle of the type having its front and rear wheels equipped with wide, ultra-low pressure tires.

II. Discussion of the Prior Art

There has been proposed in the prior art (as in Japanese Patent Laid-Open No. 59-167333) the riding-type, off-road four-wheel drive vehicle which has its two front wheels and two rear wheels surrounded with wide and ulta-low pressure tires (i.e., the so-called "balloon tires"). Vehicles of this type generally have their body size made smaller than that of an ordinary automobile. As a result, the front tread width (i.e., the center-to-center distance of the two front wheels) is relatively small, while the tires to be attached to the wheels are relatively wide, and thence, little space is left between the two front steerable wheels to accommodate the drive and suspension systems.

Where the front wheels of the four-wheel drive vehicle are to be coupled to the frame by means of an independent suspension, a differential gear is usually attached to the vehicle body in the space between the two front wheels and driven shafts are coupled by universal joints (U-joints) to the differential output shafts and to the axles of the front wheels.

In vehicles having the construction described above, the driven shafts are necessarily short to fit between the wide tires and the differential and, hence, the U-joints of the driven shafts are subjected to significant bending forces when the front wheels move up and down or are steered due to the large pivot angle of the front wheel axles. As a result, the U-joints tend to become weakened due to the repeated bending moments. The prior art solution to this problem was to make the vertical stroke of the front wheels (i.e., the up and down wheel travel) small. If the vehicle is equipped with a front wheel independent suspension system, this results in degraded performance as far as comfort and ridability are concerned.

Furthermore, in the prior art design being discussed, when the vehicle is traveling uphill, the load distribution to the front wheels is reduced, as is the road gripping force of the front wheels. Hence, the front wheels tend to slip which makes it difficult to effectively transmit their drive force to the road surface.

SUMMARY OF THE INVENTION

The present invention is an off-road, four-wheel drive vehicle having two steerable front wheels and two rear wheels each supporting wide, ultra-low pressure tires, an engine mounted in the vicinity of the center of the vehicle body, and a riding-type driver's seat attached to an upper portion of the vehicle body, wherein the improvement comprises: a front wheel independent suspension system for suspending said front wheels in a manner to freely move up and down with a relatively wide stroke, and wherein said front wheels are equipped with tires which are narrower than the rear wheels, but whose tread width is wider than that of the rear wheels. Furthermore, a one-way clutch is used to couple the engine output to the front differential so that in normal operation when no wheels are slipping, only the rear set of wheels will be driven. This improves the ease of steering during times when the vehicle is being driven on hard surfaces with no tire slippage.

OBJECTS

It is the principal object of the present invention to provide an off-road, four-wheel drive recreational vehicle having an independent front wheel suspension but which does not sacrifice ride, comfort nor weaken the univeral joints associated with the driven shafts of the front wheels.

Another object of the present invention is to provide an off-road, four-wheel drive vehicle exhibiting excellent performance even when traversing rough roads.

Still another object of the present invention is to provide an off-road, four-wheel drive vehicle which has its front wheel road gripping force augmented during uphill travel so as to transmit the front wheel drive force efficiently to the road surface.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
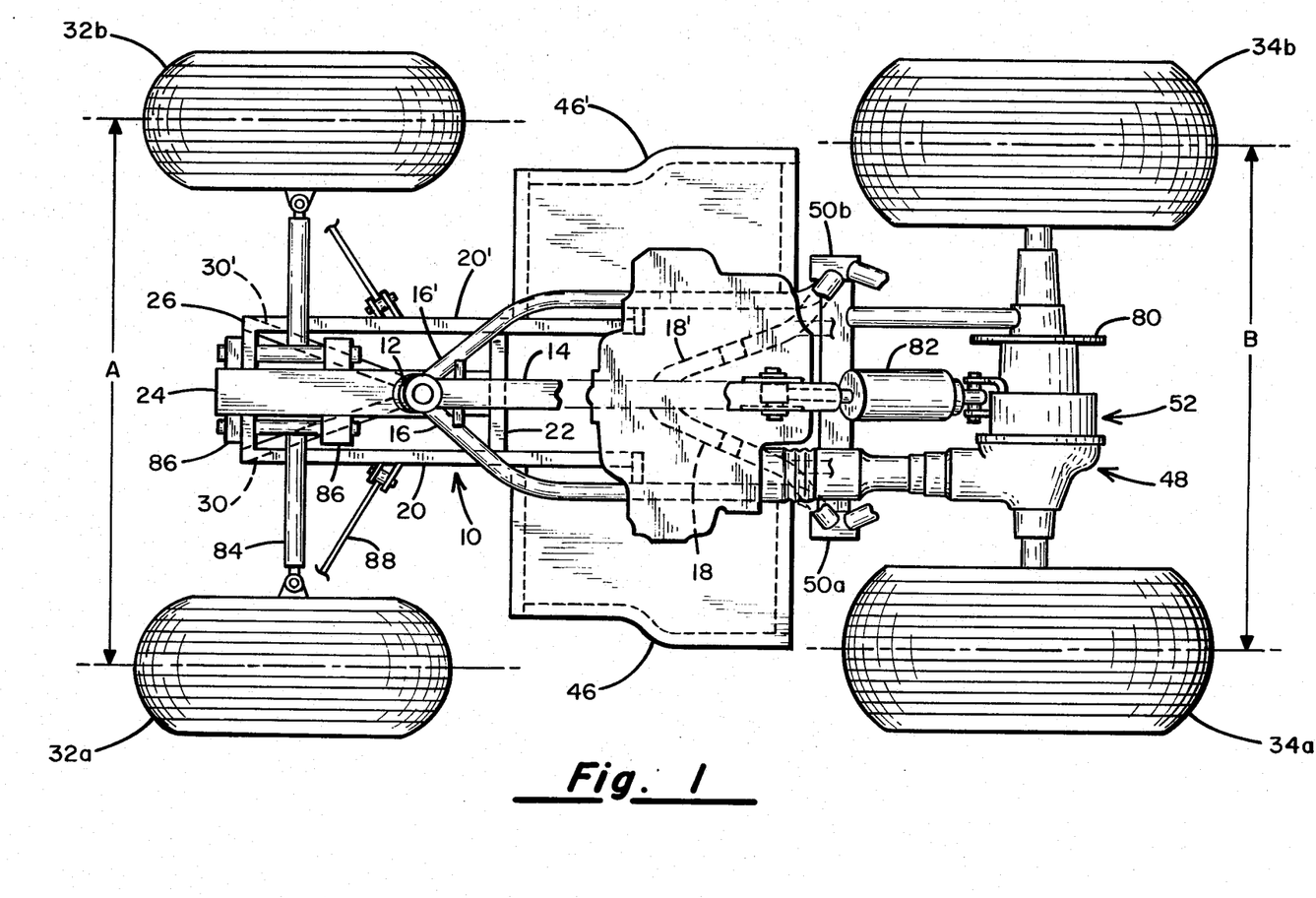
FIG. 1 is a top plan view showing the layout of one embodiment of the present invention.
Figure 2:
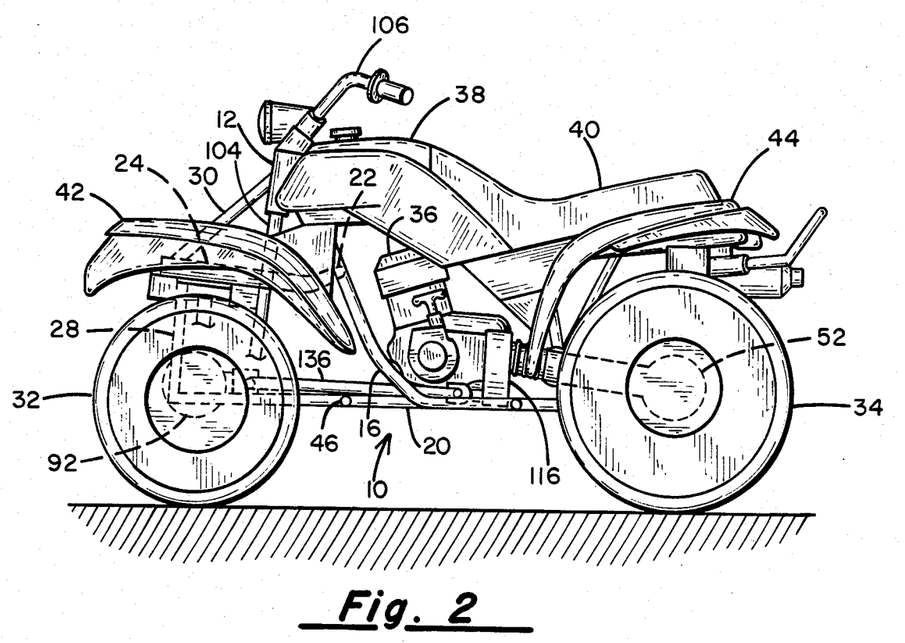
FIG. 2 is a side elevation showing the embodiment in its entirety.
Figure 3:
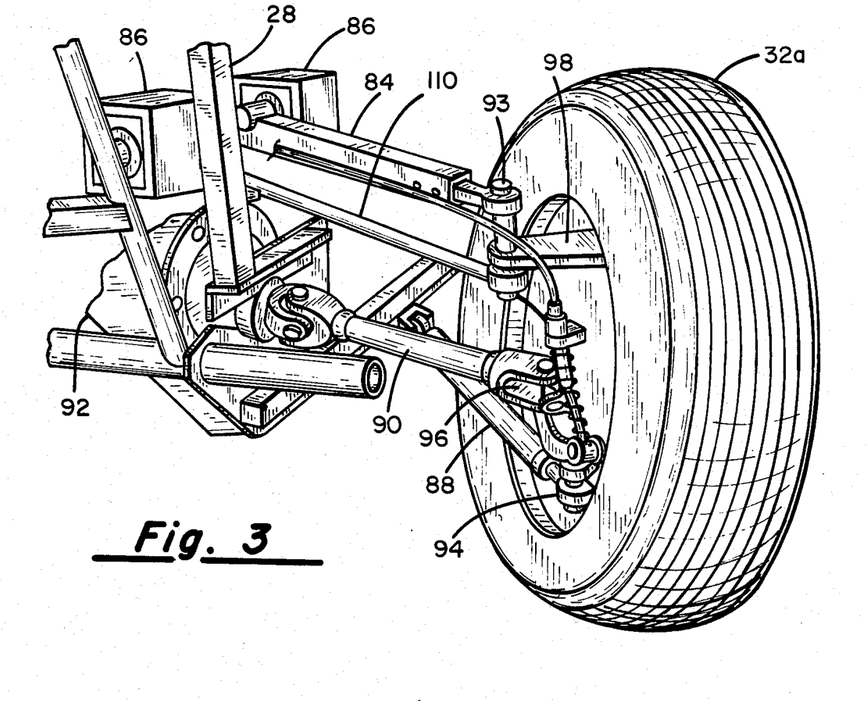
FIG. 3 is a partial perspective view illustrating the structure of a front wheel independent suspension.
Figure 4:
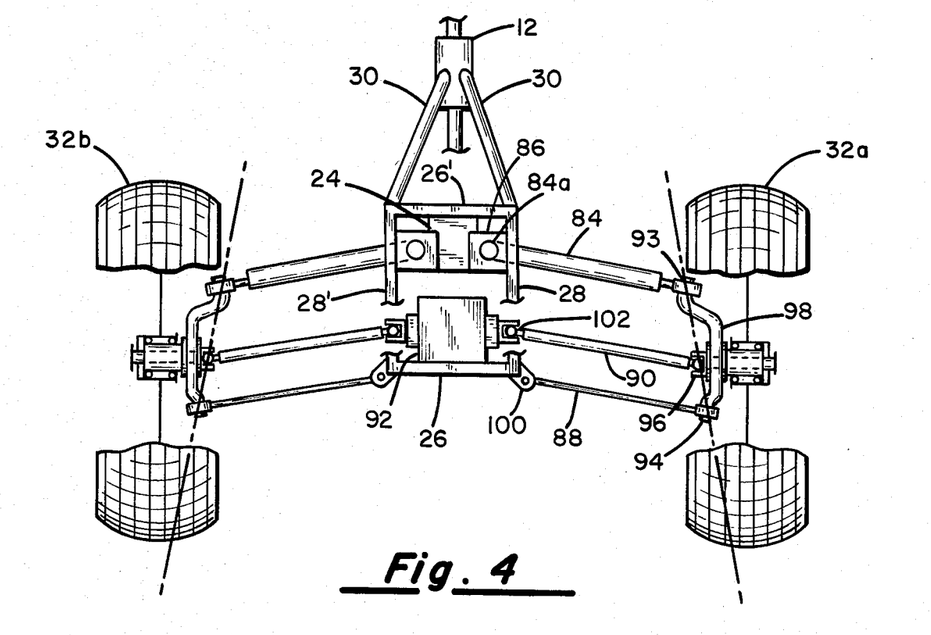
FIG. 4 is a partial front elevation of the vehicle in accordance with the present invention.

In FIGS. 1 and 2, reference numeral 10 indicates a body frame. This body frame 10 comprises a main tube 14 extending backward from a steering head 12, a pair of right and left down tubes 16 and 16' welded to the main tube, a pair of right and left seat-supporting tubes 18 and 18', a pair of right and left front lower members 20 and 20' extending forward from below the down tube 16 and 16', a cross tube 22 connecting the down tubes 16 and 16', a front upper member 24 extending transversely of the frame and forward of the cross tube 22, front cross members 26 and 26' and front upright members 28 and 28' (as best seen in FIG. 4) connecting the front end of the front upper member 24 and the front lower members 20 and 20', and a pair of right and left reinforcement members 30 and 30' connecting the front upper member 24 and the steering head 12.

Numeral 32 (or 32a and 32b) indicates front wheels, and numeral 34 (or 34a and 34b) indicates rear wheels. These front and rear wheels are provided with wide, ultra-low pressure tires. The front wheels 32 have tires which are of a smaller diameter and width than those of the rear wheels 34. The front tire diameter may be enlarged to the same as the rear tire so as to have the same axle ratios. Moreover, as can be seen from FIG. 1, the front wheels 32a and 32b have a larger tread with A than the tread width B of the rear wheels 34a and 34b.

In FIG. 2, numeral 36 indicates an engine mounted in the vicinity of the center of the vehicle body while numeral 38 indicates a fuel tank attached to the back of the steering head 12. Positioned on the upper portion of the vehicle body at the back of the fuel tank 38 is a driver's seat 40. The front and rear fenders are identified by numerals 42 and 44, respectively. Indicated by numerals 46 and 46' are right and left plate-shaped footrests which protrude to the right and left sides from the down tubes 16-16' and the front lower members 20-20' which, as mentioned, are located below the vehicle body and extends between the front wheels 32 and the rear wheels 34. These footrests 46 and 46' are constructed and positioned to effectively prevent the driver from being hit by mud or pebbles which may be thrown by the front wheels 32.

Indicated generally by numeral 48 in FIG. 1 is a rear arm assembly for supporting the rear wheels 34 and their axle in a vertically movable manner. This rear arm 48 has its front ends secured to pivot brackets 50 (or 50a and 50b) of the aforementioned body frame 20-20' and the rear end of the rear arm 48 supports a rear differential gear assembly 52, more particularly shown in FIGS. 10 and 11. Alternatively, arm 48 may support a solid axle. This rear differential gear assembly 52 acts both to transmit a driving force during a turning manuever to the innermost rear wheel 34, while allowing the outer wheel to idle or freewheel, and to transmit the retarding force to both wheels when the vehicle is braked. Such a limited slip differential mechanism is described in applicant's co-pending application for "RECREATIONAL VEHICLE WITH LIMITED DIFFERENTIAL", Ser. No. 559,714, filed Dec. 9, 1983 and allowed May 10, 1985.

Figure 10:
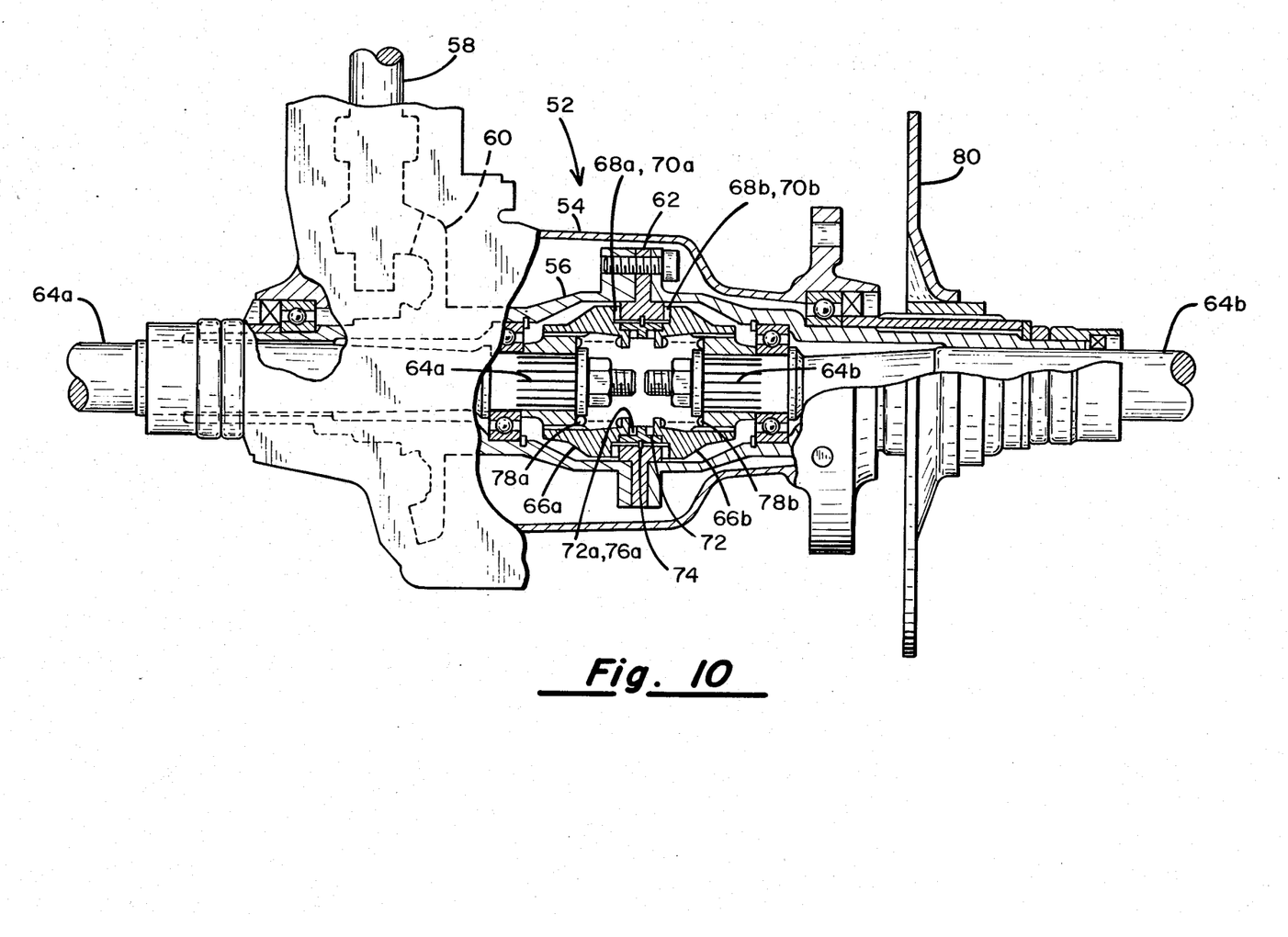
FIG. 10 is a partially sectional view showing a rear differential gear.
Figure 11:
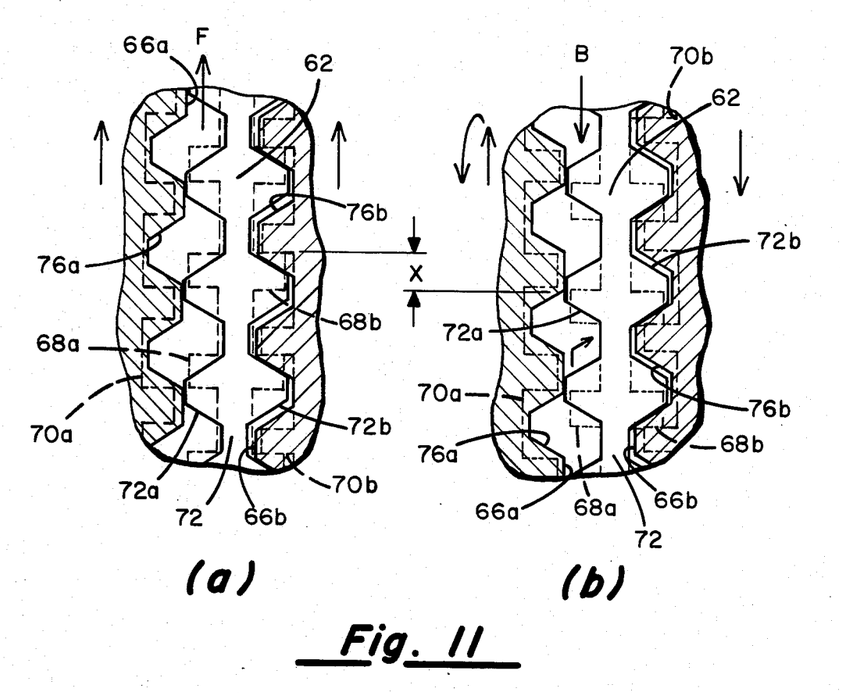
FIGS. 11(a) and 11(b) show developed views of the cam ring and slide gears of the limited differential.

As can best be seen in FIGS. 10 and 11, in the inner wall of a support casing 54 there is rotatably held a separable cylindrical housing member 56 on which is fixed a large bevel gear 60 which meshes with a rearwardly-extending motor-driven drive shaft 58. A spider 62 is also fixed on that cylindrical member 56. To the inner ends of rear axles 64a and 64b, there are slidably splined slide gears 66 (or 66a and 66b) which can move in the axial directions. The spider 62 is formed in its two sides with groups of toothed lands 68 (or 68a and 68b), which can mesh with recesses 70 (or 70a and 70b) formed in the slide gears 66. Incidentally, the toothed lands 68 are preferably formed into a rectangular shape, when viewed in top plan view as in FIG. 11, and the recesses 70 are made wider than the tooth width of the lands 68.

Numeral 72 identifies a cam ring which is fitted into a central groove formed in the spider 62 by means of a circlip 74. Moreover, the cam ring 72 is allowed to have a small play in the rotating direction as indicated by the letter x in FIG. 11. The cam ring 72 is formed on both its sides with cam surfaces 72a and 72b which have a generally trapezoidal section. The slide gears 66 are, in turn, formed with generally trapezoidal cam grooves 76 (or 76a and 76b) which are adapted to slip into and out of engagement with those cams 72a and 72b. The slide gears 66 are biased toward the spider 62 by the action of a return spring 78 (or 78a and 78b) so that the cams 72 may be brought into engagement with the cam grooves 76.

The left-hand rear axles 64a in FIG. 10 is rotatably journaled in the support casing 54 of the differential gear assembly 52. The righthand rear axle 64b is coaxially disposed within and extends outwardly from the support casing 54. A brake disk 80 is splined to the cylindrical member 56 and rotates therewith.

As is explained in the aforereferenced application Ser. No. 559,714, with this rear, limited slip differential gear assembly 52, when a difference in rotational speed is caused between the right and left rear wheels 34a and 34b, e.g., during the right turn, the outer (left wheel) wheel 34a rotates faster than the inner wheel 34b so that the cam grooves 76a of the slide gear 66a rotating with the outer wheel 34a rides on the cam 72a. This results in the slide gear 66a moving toward the outer wheel 34a to thereby release the engagement between the toothed lands 68a and the recesses 70a. Thus, at this time, the drive force is transmitted only to the slower moving inner wheel 34b. The opposite result prevails on a left turn.

FIG. 11(a) shows the behavior during the right turn. The letter F appearing in FIG. 11(a) designates the direction of rotation of the spider 62 and the cam ring 72.

In a braking operation in which the engine is braked or in which a brake is applied to grasp the disk 80, the braking force is applied to the spider 62 in the direction opposite to that occurring during the drive. FIG. 11(b) shows this behavior, and letter B appearing in the figure designates the direction of the braking force. At this time, the cam ring 72 rotates with a slight offset of phase X with respect to the spider 62, the offset being due to the play in the cam ring and its position being controlled by the braking action applied through the spider 62 to the slide gear 66B. When the vehicle is braked while it is turning to the right, the cam grooves 76a of the slide gear 66a associated with the outer wheel (or left wheel) 34a are already released from cam surface 72a. As the brake force is momentarily applied to the spider 62, a retarding force is applied to slide gear 66b by the contact of tooth 68b and its mating surface 70b on the slide gear. The outer wheel (34a) rotates the slide gear 66a offset X and allows slide gear 66a to lock into place to transmit the retarding force of spider 62. At least one of the slide gears 66a or 66b must be transmitted the torque supplied by the spider 62. When one slide gear is under power drive or is braking, the opposite slide gear can rotate faster but only in the same direction as the power is being transmitted.

With reference again to FIG. 1, numeral 82 indicates a rear shock absorber which has its upper and lower ends pivotally hinged to the aforementioned main tube 14 and the casing 54 of the rear differential gear 52, respectively. This provides a damping force to restrain the oscillation of the rear axle/wheel assembly when traversing uneven terrain.

Next to be described will be the front wheel independent suspensions. Only the suspension associated with the left wheel need be described because of the bilateral symmetry of the construction of the suspension. Numeral 84 appearing in FIGS. 1, 3, 4 and 5 indicates a swing arm which can swing up and down in a generally vertical plane. This swing arm 84 has its body side bearings 86 (or 86a and 86b) arranged on the front upper member 24 of the aforementioned body frame 10 and is equipped with torsional rubber springs. Specifically, each bearing 86 is constructed by press-fitting a shock-absorbing rubber member (not shown) between a sleeve fixed on the front upper member 24 and a shaft 84a (FIG. 4) integrated with the swing arm 84. Incidentally, the shaft 84a can be dislocated slightly vertically and transversely through the deformation of the rubber member.

Figure 5:
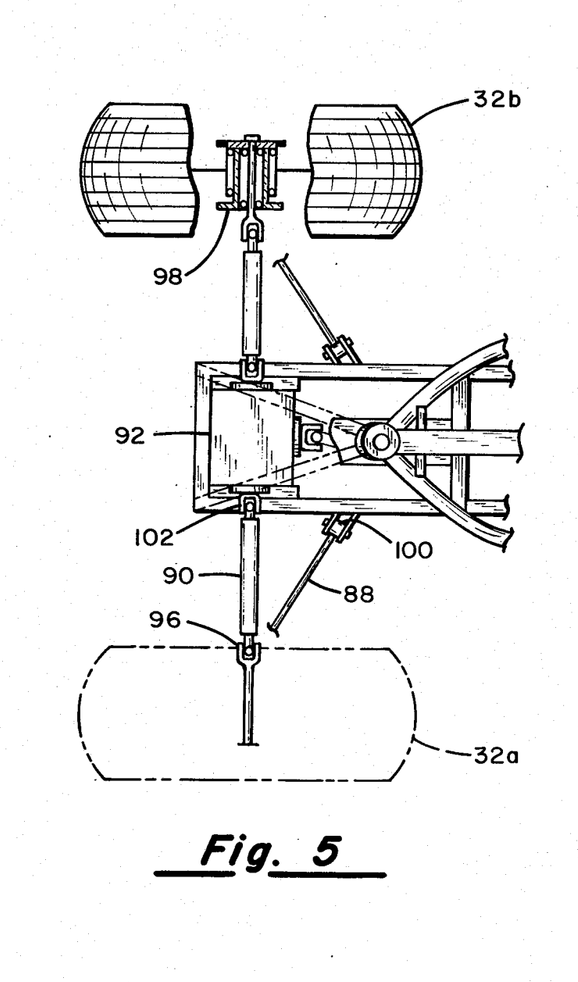
FIG. 5 is a partial top plan view showing the front wheel drive system.

Numerals 88 and 90 indicate a radius link and a front driven shaft, respectively. This front driven shaft 90 is connected to a front differential gear assembly 92 which is disposed between the front lower members 20–20′. The front differential gear assembly 92 preferably has substantially the same construction as that of the aforementioned rear differential gear 52. The front driven shaft 90 is connected to the front wheel spindle 98 by a U-joint 96, while swing arm 84 and the link 88 have a ball-joint connection to that wheel hub. The U-joint 96 and the ball joints 93 and 94 at the side of the front wheel spindle 98 are positioned on the king pin axis C of the front wheel 32. The ball joints 100 and 102 joining the link 88 and the front driven shaft 90 to the body frame are longitudinally spaced from each other (as best seen in FIG. 5). Specifically, the front driven shaft 90 is arranged, as seen in a top plan view, generally in parallel with the swing arm 84, and the ball joint 100 of the link 88 is positioned rearward of the front driven shaft 90. As a result, the upper portion of the front wheel spindle 98 has its movement regulated in the longitudinal directions by the swing arm 84 whereas the lower portion of the wheel spindle has its movement regulated in the longitudinal direction by the front driven shaft 90 and the link 88. Incidentally, both the front wheels 32a and 32b are equipped with drum brakes but can be equipped with disk brakes as on the rear wheel drive assembly.

The front wheel independent suspension as the construction thus far described, and the front wheels 32a and 32b have narrower tires and a wider thread width (A) and the rear wheel tread width (B). This makes it possible to elongate the front driven shafts 90. As a result, the pivot angle of the front driven shafts 90 accompanying the vertical movement of the front wheels 32 can be made much smaller than was possible using prior art design techniques which thereby reduces the bending angles of the U-joints 96 and 102 at either end of the driven shafts. This results in a longer life and less frequent repair of the U-joints 96 and 102.

Figure 6:
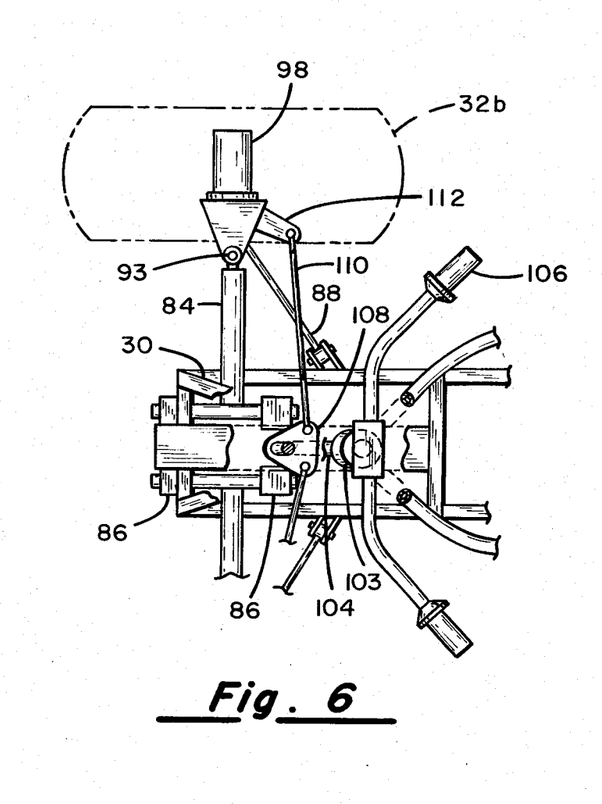
FIG. 6 is a partial top plan view showing a front wheel steering mechanism.

Indicated by numeral 103 is a steering shaft which is rotatably fitted in the aforementioned steering head 12 and which has its upper end supporting a handlebar 106. The lower portion of the steering shaft 104 (FIG. 2) extends through the front upper frame member 24 and has its lower end secured to a steering bracket 108 (as best seen in FIG. 6). This steering bracket 108 is connected by a tie rod 110 to a knuckle arm 112 which protrudes from the front wheel spindle 98. As a result, the front wheels 32 are steered by turning the steering handle 106.

The power train comprises the engine 36 which is equipped at its left-hand rear portion with an output shaft 114, which protrudes rearward. On this output shaft 114, there is mounted a chain/sprocket mechanism indicated generally by 116 which is used to couple the engine output to the front and rear wheels via their respective differential gear assemblies. More specifically, the chain/sprocket mechanism 116 is constructed of an upper shaft 118 splined to the engine output shaft 114, a lower shaft 120 positioned below the upper shaft 118, a lower tubular sleeve 122 rotatably fitted on the lower shaft 120, two sprockets 124 and 126 mounted on the upper shaft 118 and the lower sleeve 122, respectively, chains 128 and 130 made to run on the two sprockets 124 and 126, respectively, and a selective one-way clutch 132 for transmitting the rotations of the lower sleeve 122 to the lower shaft 120.

Figure 7:
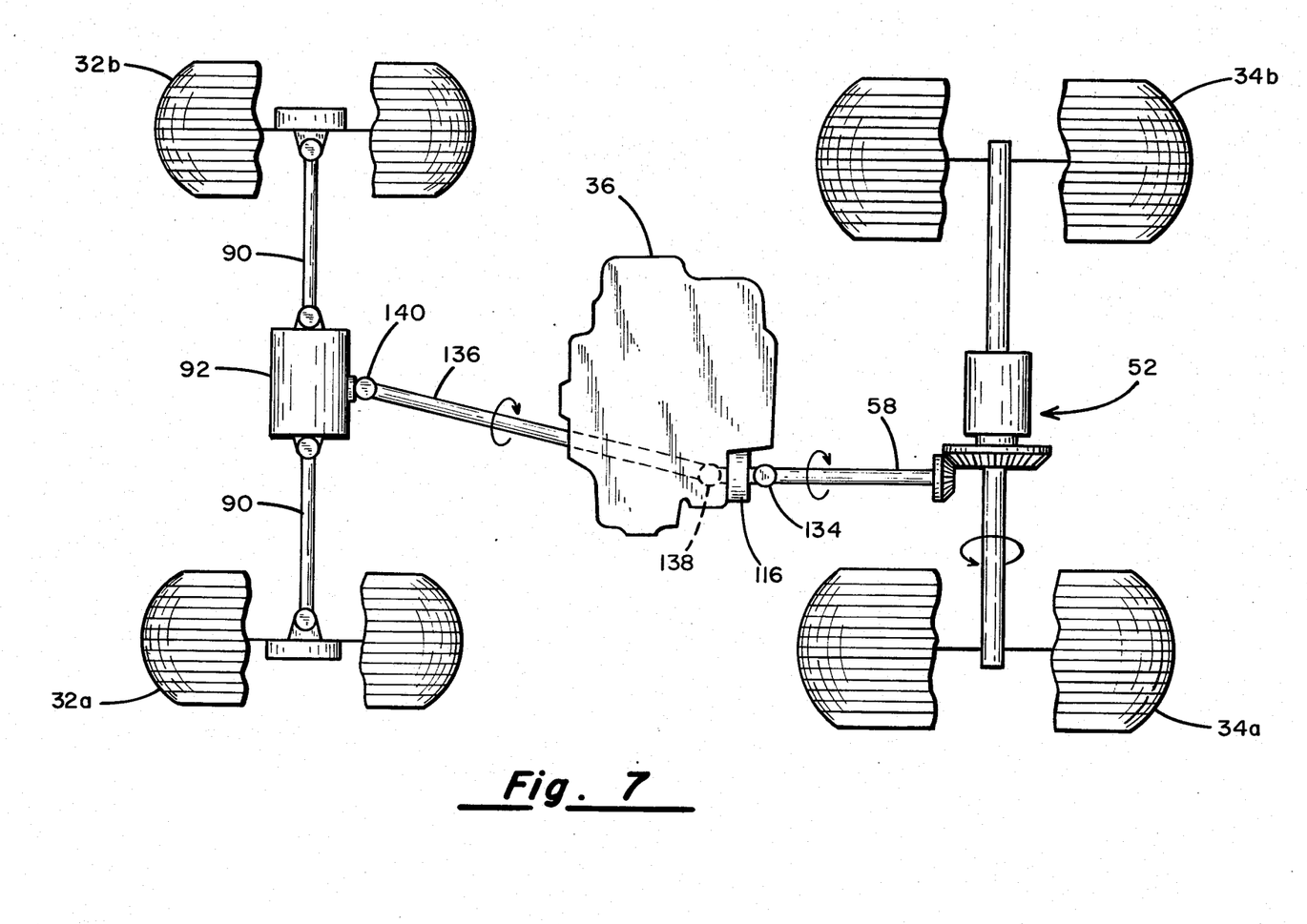
FIG. 7 is a schematic top plan view showing the complete four-wheel drive system of the vehicle.
Figure 8:
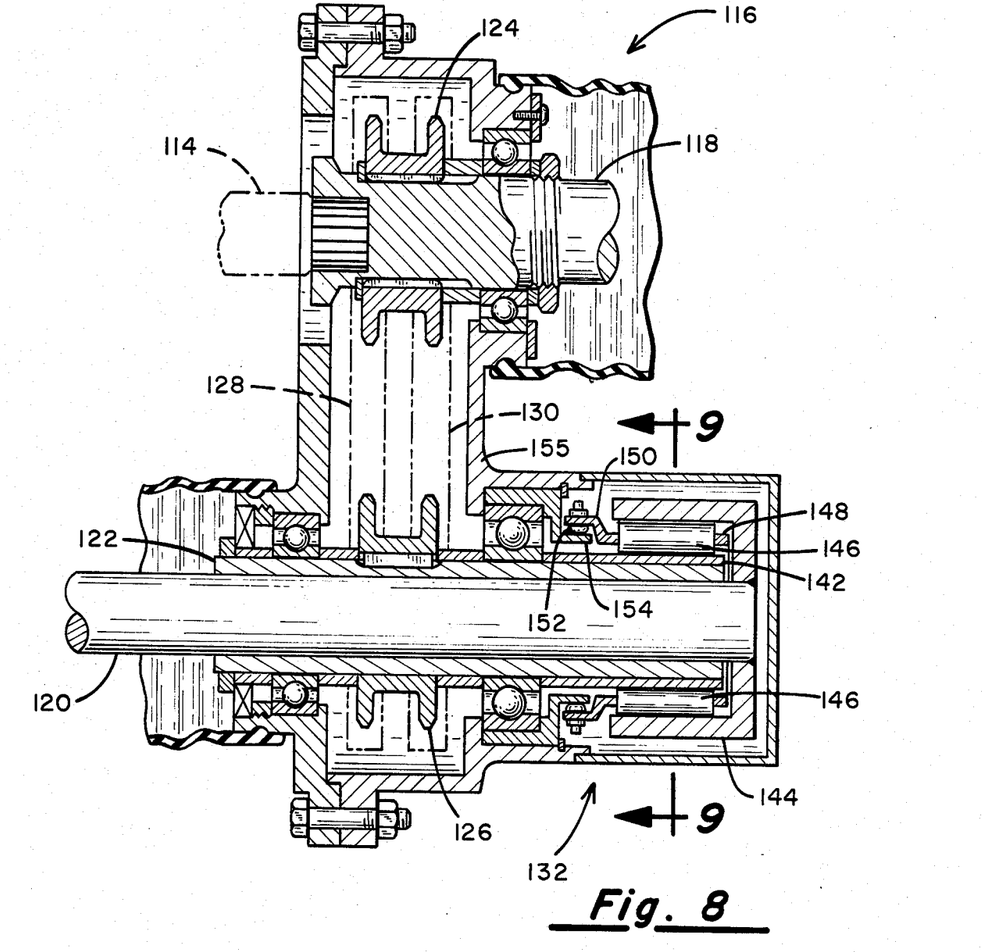
FIG. 8 is a partial cross-sectional view showing a chain reduction gear for distributing the engine output between front and rear wheel drive forces.

As shown in FIG. 7, the rotation of the upper shaft 118 is transmitted through a U-joint 134 to the aforementioned rear drive shaft 58 (as shown in FIG. 10) and further through the rear limited slip differential gear assembly 52 to the rear wheels 34. The rotation of the lower shaft 120 is transmitted to the front differential gear assembly 92 through a drive shaft 136 extending below the engine 36. Numerals 138 and 140 indicate U-joints which are mounted at either ends of the drive shaft 136.

This selective one-way clutch 132 is comprised of an inner race 142 of polygonal cross-section fixed to the rear end of the lower sleeve 122, an outer race 144 fixed to the lower shaft 120, a plurality of rollers 146 sandwiched between the two races 142 and 144, and a cage 148 for holding the respective rollers 146. Integrally formed with the cage 148 is an arm 150 which extends outward from the cage 148 and to which a friction member 152 is secured. This friction member 152 is in sliding contact with a ring 154 which is attached to the side of the casing 155.

Figure 9:
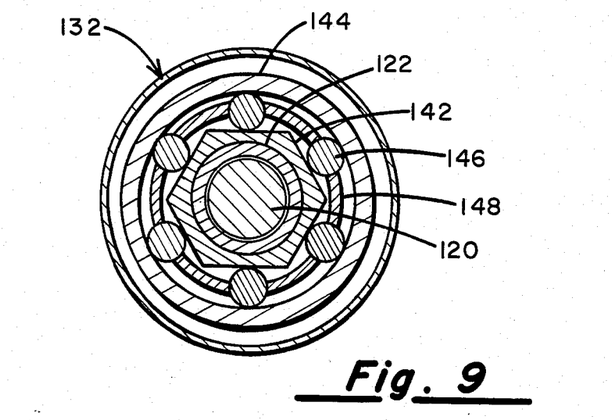
FIG. 9 is a section taken along line IX—IX of FIG. 8.

If the lower sleeve 122 and the inner race 142 are rotated in either direction of FIG. 9, by the engine 36, the cage 148 remains stationary due to friction member 152 so that the rollers 146 are wedged between the two races 142 and 144 to effect the transmission of rotations. If the speed of rotation of the lower shaft 120 exceeds that of the lower sleeve 122, the outer race 144 slightly moves the rollers 146 in the same direction. Since, at this time, the frictional resistance of the friction member 152 and the ring 154 is exerted upon the rotations of the case 148, this case 148 is not rotated excessively so that no rotation is transmitted from the outer race 144 to the inner race 142.

If in this embodiment, the speed at which the engine 36 drives the rear wheels 34 is set at a higher value than that at which the engine 36 drives the front wheels 32, as by properly changing the reduction ratio of the chain mechanism 116, the reduction ratio of the front differential gear 92 or the diameter of the front wheels 32, the vehicle runs, normally being powered solely by the rear wheel drive, and, hence, the running characteristics obtained are similar to those of a rear-wheel drive vehicle, especially as regards the steering force required by the driver. Incidentally, at this time, the outer race 144 of the selective one-way clutch 132 rotates at a higher speed than that of the inner race 142 driven by the engine 36. Despite this fact, however, no disadvantage arises because the rotation of the outer race 144 is not transmitted to the inner race 142.

If the rear wheels 34 should slip while the vehicle is running on a rough road in the above-specified state, the rotation of the outer race is also transmitted to the front wheels 32 so that the vehicle will be driven by all four wheels.

During a turning operation, on the other hand, the drive force is transmitted to the particular rear wheel 34 which is located at the inner side of the turn and the other free-wheels. When the vehicle comes to a soft spot or ice on the road so that the inner rear wheel 34 slips, the drive force is consecutively transmitted to the outer rear wheel 34 or the inner front wheel 32 and further to the outer front wheel 32 depending upon the slipping states of the respective wheels.

Since the chain mechanism 116 is equipped with the selective one-way clutch 132 for transmitting the rotations only from the engine 36 to the front wheels 32, the front wheels travel a longer distance than the rear wheels by the track difference between the front and rear wheels during the turn. If there is no slippage at the rear, the front drive transmits no power and, as a result, the steering force required of the driver is reduced and system operation is improved over full-time, fourwheel drive by this automatic decoupling.

If the rear wheels 34 slip while the vehicle is running uphill, the drive force will be transmitted to the front wheels 32. These front wheels 32 are designed to be more narrow than the rear tires and thus they have a smaller area of ground contact and greater pressure per unit area upon the ground. As a result, the front wheels 32 tend to have greater non-slip properties so that their drive force can be effectively transmitted to the road surface.

Thanks to the provision of the front differential gear assembly 92, however, the difference in the speeds of rotation between the two front wheels 32 during the turn is satisfactorily absorbed to improve the steering characteristics.

Since, in the present embodiment, the spacing between the outer sides of the two front wheels 32 is made substantially equal to that between the outer sides of the two rear wheels 34 (as best seen in FIG. 1), the space between the two front wheels 32 can be effectively utilized without excessively increasing the body width while maintaining good stability in the vehicle body. However, is should be understood that the present invention can also contain the construction in which the spacing between the outer sides of the two front wheels is made larger than that between the outer sides of the two rear wheels.

As has been described hereinbefore, according to the present invention, the front wheels are equipped with narrower tires than those used on the rear wheels and they are designed to have a larger tread width than the rear wheels. Thus, the spacing between the inner sides of the two front wheels can be enlarged over that of known prior art designs to thereby accommodate longer driven shafts which are needed when a front wheel independent suspension system of the type described herein is used. By employing longer driven shafts the pivot angle of the front driven shafts is markly reduced as the front wheels move up and down independently such as when traversing irregular terrain. Accordingly, the bending angle of the universal joints located at each end of the front driven shaft is reduced and the universal joints are less subject to failure.

Because the tires of the front wheels are made narrow, their shock-absorbing characteristics are reduced as compared to the rear wheels. According to the present invention, however, this reduction is compensated for in that the cushioned vertical movements of the front wheels by the torsion springs 86 can be substantially increased so that the rough-road runability is improved.

Since the front wheels have increased ground contact pressure, their road surface gripping characteristic is improved, causing their drive force to be efficiently transmitted to the road surface.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. An off-road recreational vehicle comprising, in combination:
   (a) a frame;
   (b) front and rear pairs of wheels, each having relatively wide, ultra-low pressure tires mounted thereon, each of said wheels being secured to an axle member;
   (c) a limited slip differential means including a drive input disposed between said axle members of said front pair of wheels;
   (d) driving means drivenly connected to the axle members of said rear pair of wheels;
   (e) means for independently suspending said frame relative to said axle members of said front pair of wheels and for resiliently securing said frame to said driving means connected to said axle members of said rear pair of wheels;
   (f) an engine supported on said frame between said front and rear pairs of wheels, said engine having an output shaft directly coupled to the drive means connected to said rear axle member; and
   (g) over-running clutch means operatively coupled to said output shaft of said engine and interposed between said output shaft of said engine and said drive input of said limited slip differential for applying a driving force to said front pair of wheels only when slipage exists between said rear pair of wheels and the ground.

2. The off-road recreational vehicle as in claim 1 wherein the tread width of said front pair of wheels is greater than that of said rear pair of wheels.

3. The off-road recreational vehicle as in claim 2 wherein said front pair of wheels are of narrower width than said rear pair of wheels.

4. The off-road recreational vehicle as in claim 3 wherein said means for independently suspending said frame relative to said axle members of said front pair of wheels for each front wheel comprises:
   (a) swing arm means having first and second ends, one end being pivotally coupled to the spindle of said wheel along the king pin axis thereof;
   (b) side bearing means attached to said frame for receiving the second end of said swing arm, said side bearing means including torsional spring means for resisting the rotational movement of said swing arm relative to said frame;
   (c) a driven shaft having first coupling means at one end thereof for coupling said driven shaft to an output shaft of said limited slip differential and second coupling means at the other end for coupling said driven shaft to said axle member of the front wheel at a location along said king pin axis of said hub and below said swing arm; and (d) a further link extending between said frame from a location rearward of the location of said side bearing means to a location on said hub along said king pin axis and below said driven shaft, the difference in tread width and tire width between said front and rear pairs of wheels allowing said driven shaft to be of an increased length.

5. The off-road recreational vehicle of claim 1 wherein said one-way clutch means comprises:

(a) a stationary clutch housing attached to said engine;

(b) a first drive element journaled for rotation within said housing and coupled to said output shaft of said engine;

(c) a clutch output shaft coupled to the input shaft of said limited slip differential means and journaled for rotation within said clutch housing;

(d) sleeve means having a polygonal cross-section surrounding at least a portion of said clutch output shaft, said sleeve means supporting a second drive element thereon;

(e) means operatively coupling said first drive element to said second drive element for rotating said second drive element; and (f) a plurality of roller members operatively disposed between said clutch output shaft and said sleeve means, said roller members being shiftable to couple the rotation of said sleeve means to said clutch output shaft when slippage of said rear pair of wheels takes place.

6. The off-road recreational vehicle as in claim 1 and further including first and second planar footrest members attached to a lower portion of said frame between said front and rear wheels and protruding transversely of said frame, said planar footrest members being of a length and width dimension to effectively shield the operator from exposure to dirt dislodged by said front and rear wheels.

* * * * *